US009794078B2

(12) United States Patent
Schwartz

(10) Patent No.: US 9,794,078 B2
(45) Date of Patent: Oct. 17, 2017

(54) FAIRLY ADDING DOCUMENTS TO A COLLABORATIVE SESSION

(71) Applicant: Edward L. Schwartz, Menlo Park, CA (US)

(72) Inventor: Edward L. Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 14/198,522

(22) Filed: Mar. 5, 2014

(65) Prior Publication Data

US 2015/0256638 A1 Sep. 10, 2015

(51) Int. Cl.
*H04L 12/18* (2006.01)
*H04L 29/08* (2006.01)
*H04L 29/06* (2006.01)
*G06F 3/14* (2006.01)

(52) U.S. Cl.
CPC .......... *H04L 12/18* (2013.01); *H04L 65/4015* (2013.01); *H04L 67/2828* (2013.01); *G06F 3/1462* (2013.01)

(58) Field of Classification Search
CPC .......................... H04L 67/2828; H04L 67/06
See application file for complete search history.

(56) References Cited

U.S. PATENT DOCUMENTS

| | | | | |
|---|---|---|---|---|
| 5,537,526 A * | 7/1996 | Anderson | ............. | G06Q 10/10 707/E17.013 |
| 5,940,082 A * | 8/1999 | Brinegar | ............. | G06Q 10/107 345/442 |
| 6,201,859 B1 * | 3/2001 | Memhard | ............... | H04M 3/56 348/E7.083 |
| 6,230,171 B1 * | 5/2001 | Pacifici | ................. | G06F 17/241 707/E17.111 |
| 7,065,540 B2 * | 6/2006 | Chandrasekaran | . | G06F 11/1471 707/674 |
| 7,200,623 B2 * | 4/2007 | Chandrasekaran | . | G06F 12/0804 |
| 7,818,679 B2 | 10/2010 | Clarke | | |
| 8,359,588 B2 * | 1/2013 | Reid | ....................... | G06F 9/547 717/133 |
| 8,370,628 B2 * | 2/2013 | Mundy | ............... | G06F 21/6209 707/608 |
| 8,407,190 B2 * | 3/2013 | Prahlad | ............... | G06F 17/3002 707/692 |
| 8,489,704 B1 * | 7/2013 | Mendez | ................ | G06F 3/1462 709/204 |
| 8,683,353 B2 * | 3/2014 | Buhrke | .................. | G06Q 10/10 715/734 |

(Continued)

*Primary Examiner* — Jimmy H Tran
(74) *Attorney, Agent, or Firm* — Patent Law Works LLP

(57) ABSTRACT

A system and method for sharing documents and markup to documents in near real-time. A server coupled with a plurality of client devices via a network is configured to fairly distribute documents to each of the plurality of client devices in one or more collaborative sessions. The server receives a document for distribution to a plurality of client devices associated with a particular collaborative session, breaks the documents into pieces, and repeatedly, until all pieces of the document are distributed: selects a piece of the document for transmission, sends the selected piece to each of the plurality of client devices, computes a delay based on the size of the selected piece and a minimum network bandwidth, and waits for the computed delay.

20 Claims, 5 Drawing Sheets

(56) References Cited

U.S. PATENT DOCUMENTS

| | | | |
|---|---|---|---|
| 8,966,112 B1* | 2/2015 | Franke | H04L 69/321 370/229 |
| 8,997,167 B1* | 3/2015 | Bliss | H04N 21/4223 725/115 |
| 9,054,913 B1* | 6/2015 | Franke | H04L 69/321 |
| 2001/0000811 A1* | 5/2001 | May | G06F 9/542 709/205 |
| 2002/0016801 A1* | 2/2002 | Reiley | G06F 17/30905 715/236 |
| 2003/0041165 A1* | 2/2003 | Spencer | H04L 12/1827 709/233 |
| 2003/0149724 A1* | 8/2003 | Chang | H04L 12/1822 709/204 |
| 2004/0010585 A1* | 1/2004 | Jones, Jr. | H04L 12/5695 709/224 |
| 2004/0088646 A1* | 5/2004 | Yeager | H04L 29/06 715/229 |
| 2005/0152447 A1* | 7/2005 | Jouppi | G06K 9/00255 375/240.01 |
| 2007/0208994 A1* | 9/2007 | Reddel | G06F 17/2288 715/205 |
| 2007/0282951 A1* | 12/2007 | Selimis | H04L 67/06 709/205 |
| 2008/0005233 A1* | 1/2008 | Cai | H04L 29/06027 709/204 |
| 2008/0091772 A1* | 4/2008 | Kasik | H04L 67/2828 709/203 |
| 2008/0141147 A1* | 6/2008 | Buhrke | G06Q 10/10 715/757 |
| 2009/0125474 A1* | 5/2009 | Kim | G06N 5/02 706/55 |
| 2010/0202509 A1* | 8/2010 | Thompson | H04N 21/23805 375/240.01 |
| 2010/0241742 A1* | 9/2010 | Douceur | H04L 65/403 709/224 |
| 2010/0302346 A1* | 12/2010 | Huang | G06Q 10/10 348/14.09 |
| 2010/0332454 A1* | 12/2010 | Prahlad | G06F 17/3002 707/654 |
| 2011/0016387 A1* | 1/2011 | Mundy | G06F 21/6209 715/255 |
| 2011/0055209 A1* | 3/2011 | Novac | G06Q 30/02 707/737 |
| 2011/0126127 A1* | 5/2011 | Mariotti | G06F 19/321 715/753 |
| 2011/0157298 A1* | 6/2011 | Huang | H04N 7/15 348/14.08 |
| 2011/0161836 A1* | 6/2011 | Mu | H04L 12/1813 715/756 |
| 2013/0047093 A1* | 2/2013 | Reuschel | G06F 3/04883 715/753 |
| 2013/0212288 A1* | 8/2013 | Jakubowski | H04L 67/08 709/228 |
| 2014/0055400 A1* | 2/2014 | Reuschel | G06F 3/041 345/173 |
| 2014/0196070 A1* | 7/2014 | Moskowitz | H04N 21/4722 725/19 |
| 2015/0049163 A1* | 2/2015 | Smurro | H04L 65/4015 348/14.08 |
| 2015/0067086 A1* | 3/2015 | Adriaens | H04L 67/1097 709/212 |
| 2015/0120870 A1* | 4/2015 | Schuman | H04L 67/06 709/217 |
| 2015/0121179 A1* | 4/2015 | Saund | G06F 3/0482 715/202 |
| 2015/0142884 A1* | 5/2015 | Veramendi | H04L 12/1813 709/204 |

* cited by examiner

FAIRLY ADDING DOCUMENTS TO A COLLABORATIVE SESSION

BACKGROUND OF THE INVENTION

1. Field of the Invention

The specification relates to a system and method for sharing documents and markup to documents in near real-time. In particular, the specification relates to a server for communicating with client devices and a protocol for sharing documents and markups fairly to each of the client devices.

2. Description of the Background Art

Network connections to a server may vary in speed and quality. Problems may arise when users with connections of various speeds are connected to a collaborative session, such as a web conference. As a result, it may be confusing to users if those with high bandwidth and low bandwidth connections see different things. For example, a user with low bandwidth may receive and see a page of a document later than other users or may not see marks other users have added to pages of the document.

For example, when a business organizes a meeting in a conference room, some employees use mobile devices, the room may include a projector for projecting slides and other users connect to the meeting remotely using their laptops and/or other mobile devices. The remote users can employ conferencing software to view the slides and marks in real-time, however the variation in bandwidth may result in viewers seeing different things at different times. Therefore, a system and method for fairly adding documents to a collaborative session is needed.

SUMMARY OF THE INVENTION

The present disclosure overcomes the deficiencies of the prior art with a system and method for sharing data (e.g., documents and marks on documents) fairly among users in a collaborative session. In one embodiment, a server coupled with a plurality of client devices via a network is configured to fairly distribute documents to each of the plurality of client devices in one or more collaborative sessions. The server receives a document for distribution to a plurality of client devices associated with a particular collaborative session, breaks the documents into pieces, and repeatedly, until all pieces of the document are distributed: selects a piece of the document for transmission, sends the selected piece to each of the plurality of client devices, computes a delay based on the size of the selected piece and a minimum network bandwidth, and waits for the computed delay.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
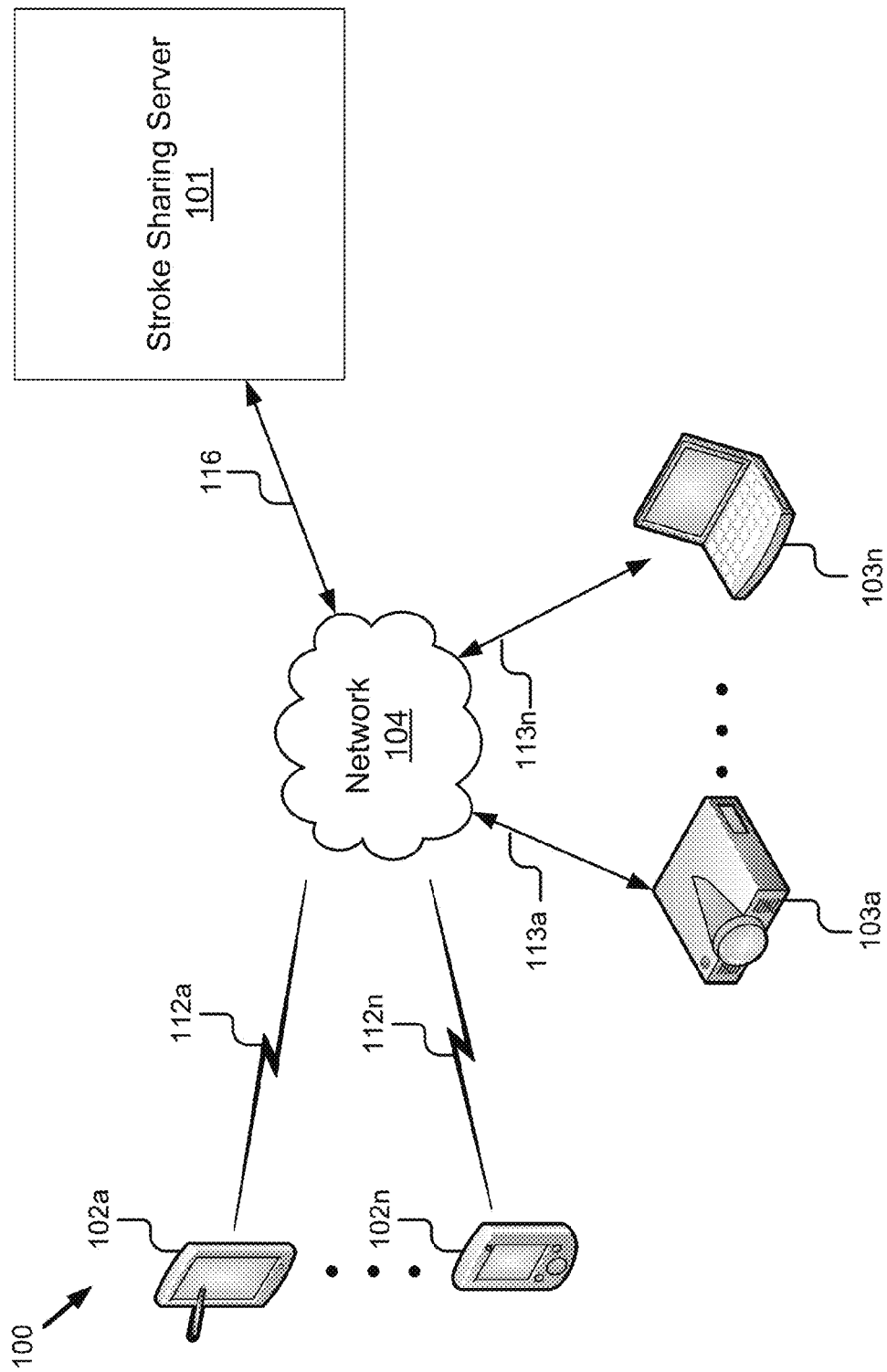
FIG. 1 is a high-level block diagram illustrating one embodiment of a system for fairly adding documents to a collaborative session.

A system and method for fairly adding documents to a collaborative session are described below. In the following description, for purposes of explanation, numerous specific details are set forth in order to provide a thorough understanding the techniques introduced herein. It will be apparent, however, to one skilled in the art that the embodiments can be practiced without these specific details. In other instances, structures and devices are shown in block diagram form in order to avoid obscuring the techniques. For example, the techniques are described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The detailed description also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for implementing a stroke sharing server for fairly adding documents to a collaborative session. The illustrated embodiment of the system 100 comprises: user devices 102a-102n, collaborative computing devices 103a-103n, a network 104, and a stroke sharing server 101. In FIG. 1 and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is shown coupled to the plurality of user devices 102a-102n, the plurality of collaborative computing devices 103a-103n, and the stroke sharing server 101, in practice any number of networks 104 can be connected to the entities.

The user devices 102a-102n are devices associated with a particular user. For example, a company provides its employees with a mobile device or a laptop. The user devices 102a-102n are each coupled to the network 104 via signal lines 112a-112n respectively. The user device 102 is any computing device including a memory, a processor and a communication capability. For example, the user device 102 can be a tablet computer, a personal digital assistant, a smart phone, a feature phone, etc. The user devices 102 can communicate with the network 104 wirelessly or through wired connectivity. The user devices 102 include one or more user applications (not shown) that generate messages to be processed by the stroke sharing server 101.

The user device 102 is adapted for sending and receiving data to and from the stroke sharing server 101. For example, the user device 102 sends a command to project an image of a presentation program document on at least one of the plurality of collaborative computing devices 103a-103n and/or user devices 102a-102n to the stroke sharing server 101. The user device 102 includes a display for viewing information provided by the stroke sharing server 101.

In one embodiment, the collaborative computing devices 103a-103n are devices associated with a particular location and/or a particular function. Collaborative computing devices 103a-103n can be assigned to a conference room or are assigned for meetings. For example, a projector and an interactive whiteboard can be assigned to a select conference room from a plurality of conference rooms inside a building. The collaborative computing devices 103a-103n are each coupled to the network 104 via signal lines 113a-113n respectively. The collaborative computing device 103 may be any computing device including a memory and a processor. For example, the collaborative computing device 103 can be a projector, a monitor, a television, an interactive whiteboard, a webcam, a microphone, a loudspeaker, a CD/DVD player, an electronic paper device, an electronic reader, a desktop computer, a tablet, a smartphone, etc.

The collaborative computing device 103 is adapted for sending and receiving data to and from the stroke sharing server 101. For example, a projector in a conference room can receive a presentation document from the stroke sharing server 101.

The stroke sharing server 101 may be any computing device including a memory and a processor which is connected to the network 104 via signal line 116. In various embodiments, the stroke sharing server 101 is configured to support collaboration between people in the same room and people in different locations with a rich interactive whiteboard style of interaction based on sharing "strokes" (marks made by users on a user device 102 or a collaborative computing device 103), images/screens, text, documents, and audio and/or video conferencing. A collaboration session may also be referred to herein as a "meeting." The stroke sharing server 101 provides APIs for documents and meetings, audio mixing (audio conference server), a stroke sharing protocol, support for clients using web browsers, accounts and shares screens captured by the controller. The stroke sharing server 101 is described in more detail below with reference to FIG. 2.

The user devices 102*a*-102*n* or the collaborative computing devices 103*a*-103*n* use a particular messaging format over a particular communication protocol to communicate with and send service requests to each other through the stroke sharing server 101. A message format defines the structure and form of the message. For example, message formats include eXtensible Messaging and Presence Protocol (XMPP); Simple Object Access Protocol (SOAP), eXtensible Markup Language (XML), Session Initiation Protocol (SIP), etc. A communication protocol defines a set of rules governing the syntax, semantics, and synchronization of communications. For example, communication protocols include eXtensible Messaging and Presence Protocol (XMPP), Session Initiation Protocol (SIP), File Transfer Protocol (FTP), Hypertext Transfer Protocol (HTTP), Message Queue (MQ), Internet Inter-Orb Protocol (HOP), etc.

Stroke Sharing Server

Figure 2:
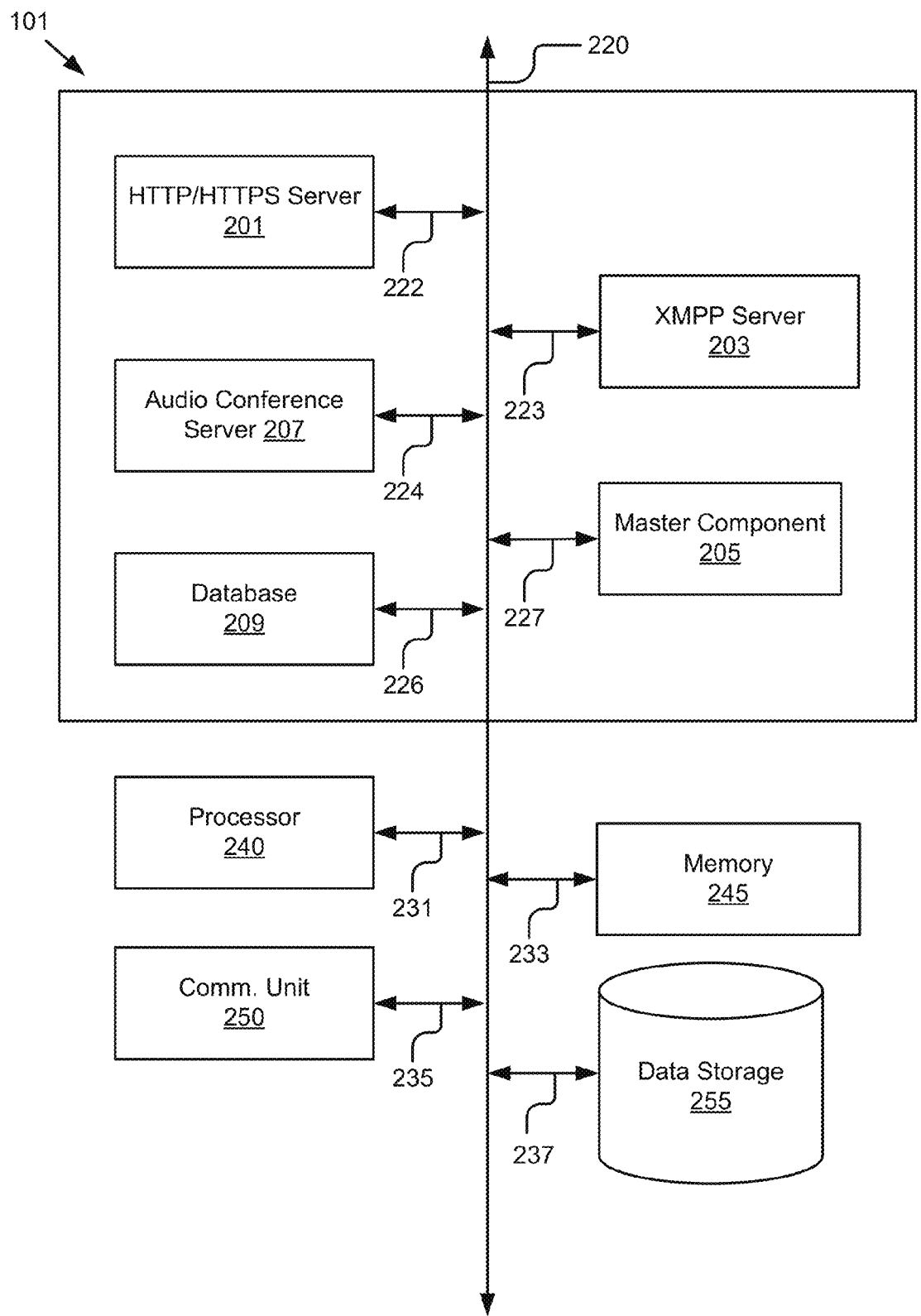
FIG. 2 is a block diagram illustrating one embodiment of a stroke sharing server.

Referring now to FIG. 2, an example of the stroke sharing server 101 is shown in more detail. The stroke sharing server is responsible for creating/managing meetings, importing/exporting/managing documents and using a messaging protocol, such as XMPP, to get the right information to clients such as user device 102 and collaborative computing device 103. FIG. 2 is a block diagram of a stroke sharing server 101 that includes: a processor 240, a memory 245, a communication unit 250, an HTTP/HTTPS server 201, an XMPP server 203, a master component 205, an audio conference server 207, and a database 209.

The processor 240, the memory 245, the communication unit 250 and data storage 255 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the server 101 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the server 101 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as strokes, images, videos or documents from a plurality of user devices 102*a*-102*n* and/or collaborative computing devices 103*a*-103*n*. The communication unit 250 transmits information to the plurality of user devices 102*a*-102*n* and/or collaborative computing devices 103*a*-103*n*. For example, the communication unit 250 transmits graphical data for displaying strokes, images, documents or videos. The communication unit 250 is coupled to the bus 220 for communication with the other components of the server 101 via signal line 235.

In one embodiment, the communication unit 250 includes a port for direct physical connection to a user devices 102, the collaborative computing devices 103, or to another communication channel. For example, the communication unit 250 includes an RJ14 or a T568A or a T568B or similar port for wired communication with the user device 102 or collaborative computing device 103. In another embodiment, the communication unit 250 includes a wireless transceiver for exchanging data with the user devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, XMPP, FTP, HTTP, HTTPS and SMTP as will be understood to those skilled in the art.

The data storage 255 is a non-transitory memory that may store data for the functionality of the stroke sharing server 101. The data storage 255 is coupled to the bus 220 for communication with other components of the server 101 via signal line 237.

In one embodiment, the data storage 255 stores a library of communication protocols and messaging formats for protocol conversion. The communication protocols and messaging formats that the data storage 255 stores include, for example, eXtensible Messaging and Presence Protocol (XMPP), Simple Object Access Protocol (SOAP), eXtensible Markup Language (XML), Java Message Service (JMS), File Transfer Protocol (FTP), Hypertext Transfer Protocol (HTTP), Message Queue (MQ), Internet Inter-Orb Protocol (IIOP), Representational State Transfer (REST), JavaScript Object Notation (JSON), Distributed Component Object Model (DCOM), Simple Network Management Protocol (SNMP), etc. In some embodiments, a protocol adaptation engine accesses the protocols and messaging formats to convert requests into a protocol and messaging format that is compatible with the recipient.

The HTTP/HTTPS server 201, in one embodiment, may include Web Distribution Authoring and Versioning (WebDAV) support and a HTTP/HTTPS reverse proxy server. In one embodiment, the HTTP/HTTPS server may be an nginx server, although other HTTP/HTTPS servers could also be used. The HTTP/HTTPS provides for communication between client devices, such as user device 102 and collaborative computing device 103, and the stroke sharing server 101. The HTTP/HTTPS server 201 is coupled to the bus 220 for communication with other components of the server 101 via signal line 222.

The audio conference server 207 supports audio conferencing, for example, audio conferencing initiated by Session Initiation Protocol (SIP) and in various embodiments is used with a SIP registrar and SIP proxy. The audio conference server 207 is coupled to the bus 220 for communication with other components of the server 101 via signal line 224.

In one embodiment, database 209 stores all the information for meetings and documents. The database may be any one of various known databases, for example, SQL, NoSQL, or the like. The database 209 is coupled to the bus 220 for communication with other components of the server 101 via signal line 226.

The XMPP server 203 routes messages between client devices, such as user device 102 and collaborative computing device 103 and the master component 205. XMPP server 203 features include accounts and rosters (contacts/buddy lists/friends), presence (what users are online or offline) and security. In one embodiment, the XMPP server can be ejabberd. In another embodiment, the XMPP server can be Openfire. In other embodiments, other XMPP servers could also be used. The XMPP server 203 is coupled to the bus 220 for communication with other components of the server 101 via signal line 223.

The master component 205 implements a stroke sharing protocol and is the central authority for the communication for meetings. In one embodiment, the master component 205 communicates changes to clients using XML commands that include Scalable Vector Graphics (SVG) or the like that define fragments of what is to be displayed by the client. The fragments may be strokes, text, images, blank pages, documents, etc. A meeting may have multiple documents and documents can have multiple pages. In one embodiment, the master component is implemented as an XMPP component and communicates with the XMPP server 203 using the XMPP component protocol. The master component 205 is coupled to the bus 220 for communication with other components of the server 101 via signal line 227.

In an alternative embodiment, the master component 205 is implemented as plug-in to the XMPP server 203.

When master component 205 adds documents to a meeting, it is beneficial to limit bandwidth (e.g., 50 Kbytes/sec) used to distribute the document so that all clients (e.g., those clients with limited bandwidth) can have a good user experience. Limiting bandwidth is particularly beneficial for limited bandwidth connections like 3G, connections with costs associated with the amount of data transferred, and for limiting server bandwidth requirements.

Using a stroke sharing protocol implemented by the master component 205, documents are delivered to each of the client devices (e.g., devices 102 and 103) in small pieces (i.e., "strokes"). In one embodiment, the pieces are smaller than 50 Kbytes. In another embodiment, the pieces range from 4 to 8 Kbytes each. The stroke sharing protocol defines a delay between sending each of the pieces to limit the bandwidth used and allow for fair server usage and bandwidth among multiple meetings.

In one embodiment, if the document comprises images, the images may be broken up and transmitted in the same manner as the rest of the page data or may be transmitted to each of the client devices 102 and 103 on a different channel depending on the size of the image. For example, if the image is a very small image (e.g., 8 Kbytes or less) the image may be broken up into stroke data and sent using the stroke sharing protocol. However, if the images are larger, the image may be sent to the client devices on a separate channel using a different technique, (e.g., lazy loading or the like).

Global Event Handler

Figure 3:
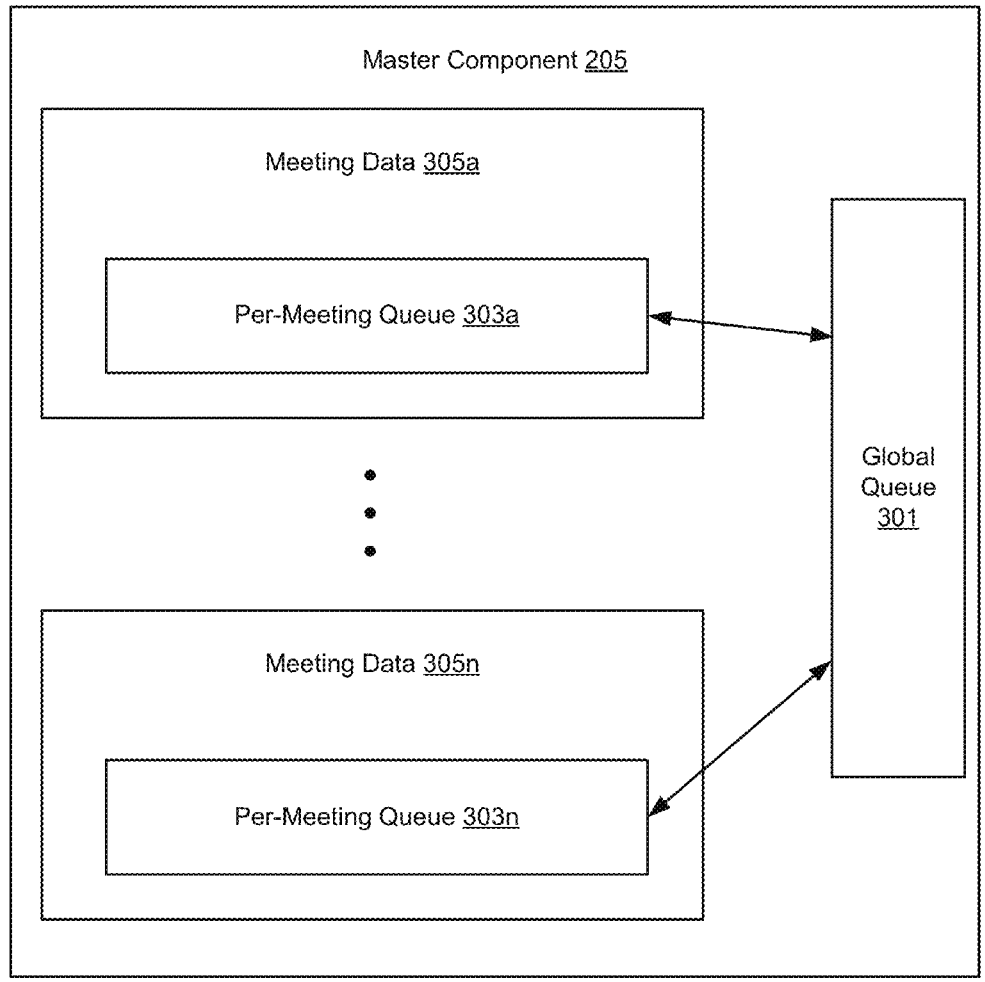
FIG. 3 is a block diagram illustrating one embodiment of a master component of the stroke sharing server.

FIG. 3 is a block diagram illustrating one embodiment of a master component 205 of the stroke sharing server. The master component 205 stores and processes meeting data 305a-305n for each meeting registered with the server. Each meeting data comprises a corresponding per-meeting queue 303a-303n to handle events used by the master component 205 to communicate with the client devices 102 and 103. The master component 205 processes events in per-meeting queue 303 and places the event in a global queue 301 for distribution to client devices. This process is described in more detail below with reference to FIG. 4 and FIG. 5.

Figure 4:
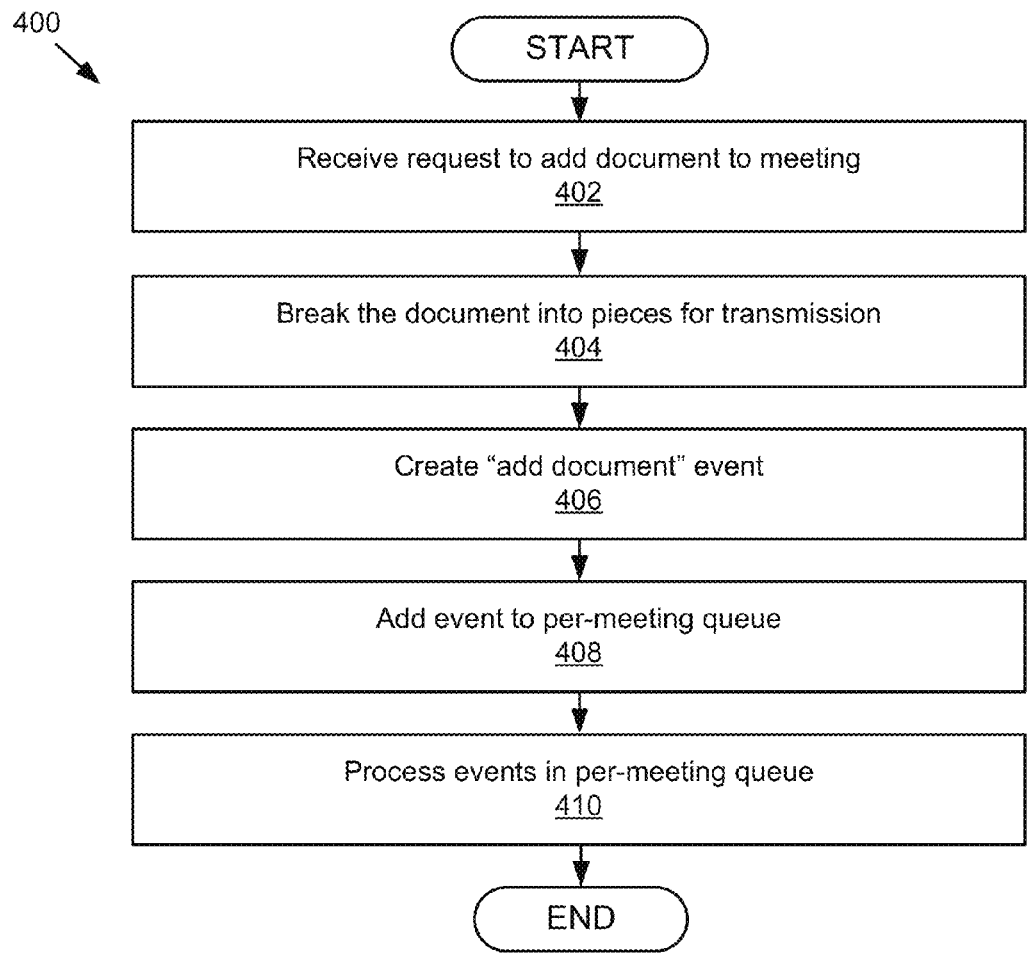
FIG. 4 is a flow diagram of one embodiment of a method for adding a document to a meeting by a master component of the stroke sharing server.
Figure 5:
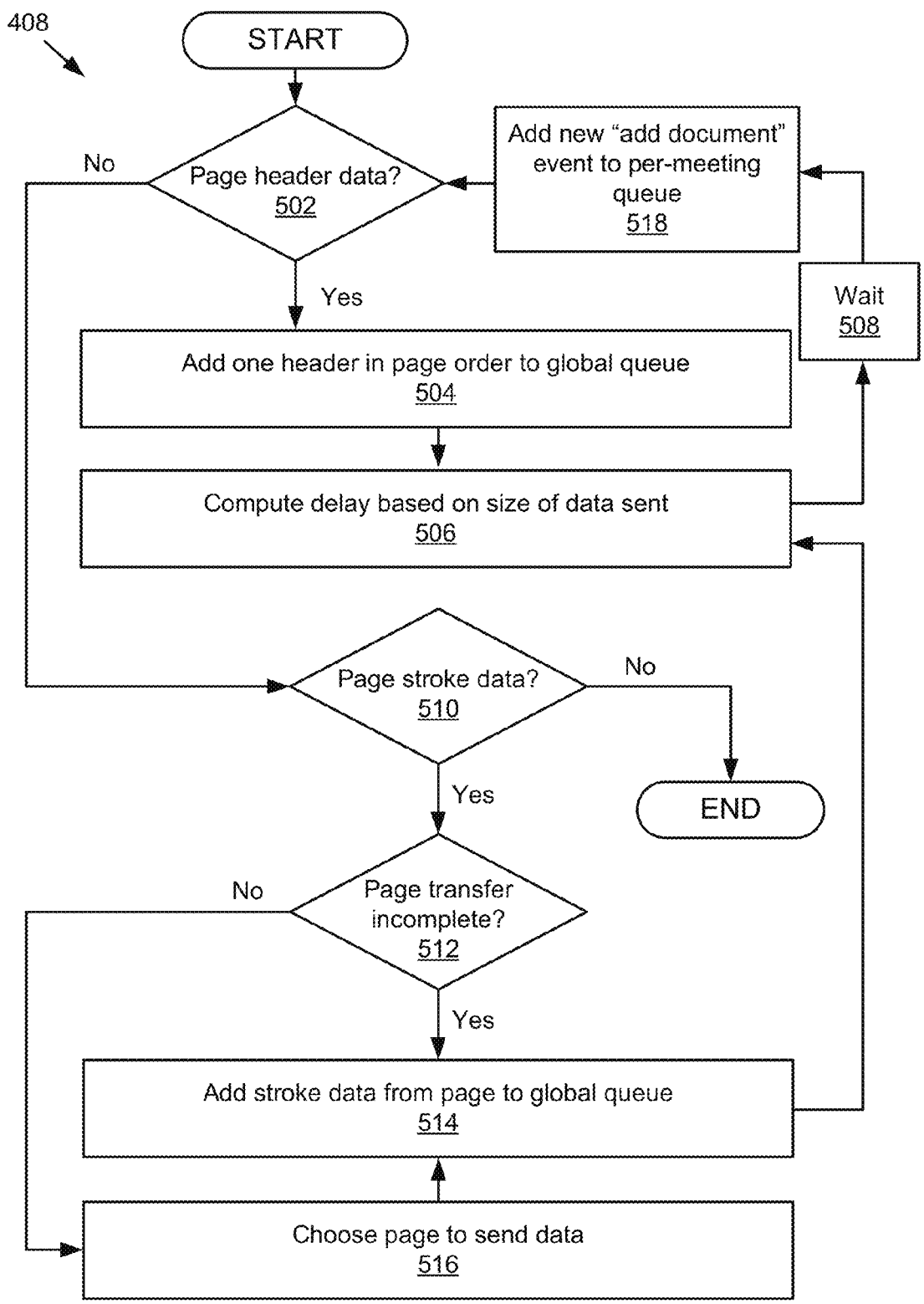
FIG. 5 is a flow diagram of one embodiment of a method for processing events in a per-meeting queue.

Referring now to FIGS. 4 and 5, various example embodiments of the methods of the techniques introduced herein will be described. FIG. 4 is a flow diagram of one embodiment of a method 400 for adding a document to a meeting by a master component of the stroke sharing server. At 402 the master component 205 receives a request to add a document to a meeting. In one embodiment, the request may be an API call to the master component. For example, an EditMeeting API call can include a moreFiles input parameter that lists the documents to be added to the meeting.

At 404, the master component 205 breaks the document into pieces for transmission and at 406, based on the EditMeeting API call, the master component 205 creates an "add document" event. A document is one or more pages and optionally document header data. A page is header data and stroke data. An example of document header data is a title for the document, page order, etc. In one embodiment, document header data is included in the page header for the first page so document pieces are page header data and stroke data. In another embodiment, the document pieces are document header data, page header data and stroke data. Stroke data may be lines, curves, paths, polygons, images, or text that make up the contents of the pages of the document.

In one embodiment, stroke data may be any drawing command or multiple drawing commands in SVG syntax. At 408 the master component 205 adds an "add document" event to the per-meeting queue 303 for the current meeting specified in the API call. In one embodiment, if there is already a per-meeting queue, the master component 205 adds the event to the existing queue. Otherwise, the master component 205 creates a per-meeting queue 303 for the meeting and adds the event to the per-meeting queue.

At 410 the master component 205 processes the "add document" event, along with any other events that are subsequently added to the per-meeting queue, and then destroys the queue.

FIG. 5 is a flow diagram of one embodiment of a method 408 for processing events in a per-meeting queue. When an "add document" event reaches the top of the per-meeting queue, the master component 205 processes the event by determining, at 502, whether there is page header data to send. If yes, at 504 the master component 205 adds one header to the global queue 301 and at 506 computes a delay based on the size of the data sent and a minimum network bandwidth. In one embodiment, the delay is the longer of 0.02 seconds and the size of the data (in Kbytes)/51200. Once added to the global queue 301 the data is transmitted to client devices 102 and 103 for the meeting in FIFO order. In one embodiment, the master component 205 processes global queue 301 and sends data to XMPP server 203, and in response to receiving the data, the XMPP server sends data to each client device 102 and 103. At 508 the master component 205 waits the amount of the computed delay and then, at 518, puts a new event in the per-meeting queue. This new event, when processed, continues to add header data to the global queue until there is no header data to send (502—No).

At 510 the master component 205 determines if there is stroke data associated with the "add document" event to send to the client devices 102 and 103. If yes, at 512 the master component 205 determines if a page transfer is incomplete. A page transfer may be incomplete when stroke data from a particular page has already been added to the global queue, but there is still remaining stroke data to add to the global queue. If yes, at 514 stroke data for that page is added to the global queue 301 by the master component 205. After the stroke data has been added to the global queue the master component again, at 506, computes a delay based on the size of the data sent and a minimum network bandwidth. At 508 the master component 205 waits for the computed delay and then, at 518, puts a new event in the per-meeting queue. This new event, when processed, repeats the process until the page has been completely sent. At 512 if the master component 205 determines that a page transfer is not incomplete, the master component 205, at 516, chooses a page from which to add stroke data to the global queue. In one embodiment, the master component 205 chooses the page that is currently being viewed on most client devices. In one embodiment, in the event of a the, the page coming first in page order would be sent. At 514, the stroke data is added to the global queue, a delay is computed at 506, the master component 205 waits for the delay, and puts a new event in the per-meeting queue. The process would repeat until at 510 there is no more stroke data for the document and the process would end.

While the master component 205 is waiting at 508, other events such as new stroke events from a client device may be put in the per-meeting queue. In a system when multiple meetings are occurring at the same time, events from a first meeting may be put in global queue 301 while the master component is waiting at 508 for a second meeting.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving a document for distribution to a plurality of client devices in a collaboration session;
breaking the document into pieces; and
repeatedly, until all pieces of the document are distributed:
  selecting a piece of the document for transmission from a first collaboration session queue;
  adding the selected piece to a global queue for transmission;
  sending the selected piece simultaneously to each of the plurality of client devices;
  computing a delay between sending the selected piece and sending a next piece of the document to each of the plurality of client devices based on a size of the selected piece and a minimum network bandwidth, wherein the minimum network bandwidth is determined based on a bandwidth of a client device, of the plurality of client devices, having a limited bandwidth connection;
  updating the global queue by adding data from a second collaboration session queue while waiting for the computed delay to send the next piece to each of the plurality of client devices;
  synchronizing the sending of the next piece to the plurality of client devices by waiting for the computed delay to send the next piece to each of the plurality of client devices; and
destroying the first collaboration session queue in response to all pieces of document being distributed.

2. The method of claim 1, further comprising, in response to receiving the document, creating the first collaboration session queue.

3. The method of claim 1, wherein selecting the piece of the document for transmission comprises:
   determining a page most viewed by users of the plurality of client devices; and
   selecting the page most viewed for transmission.

4. The method of claim 1, wherein the pieces of the document comprise header and stroke pieces.

5. The method of claim 4, wherein the stroke pieces of the document are in scalable vector graphics (SVG) format.

6. The method of claim 1, wherein the delay is computed using a token bucket algorithm.

7. The method of claim 1, further comprising transmitting images of the document on a different channel using a lazy loading algorithm.

8. A system comprising:
   one or more hardware processors; and
   a memory storing instructions, which when executed by the one or more hardware processors, cause the system to:
      receive a document for distribution to a plurality of client devices in a collaboration session;
      break the document into pieces; and
      repeatedly, until all pieces of the document are distributed:
         select a piece of the document for transmission from a first collaboration session queue;
         add the selected piece to a global queue for transmission;
         send the selected piece simultaneously to each of the plurality of client devices;
         compute a delay between sending the selected piece and sending a next piece of the document to each of the plurality of client devices based on a size of the selected piece and a minimum network bandwidth, wherein the minimum network bandwidth is determined based on a bandwidth of a client device, of the plurality of client devices, having a limited bandwidth connection;
         update the global queue by adding data from a second collaboration session queue while waiting for the computed delay to send the next piece to each of the plurality of client devices;
         synchronize the sending of the next piece to the plurality of client devices by waiting for the computed delay to send the next piece to each of the plurality of client devices; and
      destroy the first collaboration session queue in response to all pieces of the document being distributed.

9. The system of claim 8, wherein the instructions cause the system to create the first collaboration session queue in response to receiving the document.

10. The system of claim 8, wherein the system communicates with the plurality of client devices using eXtensible Messaging and Presence Protocol (XMPP).

11. The system of claim 8, wherein to select the piece of the document for transmission, the instructions cause the system to:
    determine a page most viewed by users of the plurality of client devices; and
    select the page most viewed for transmission.

12. The system of claim 8, wherein the pieces of the document comprise header and stroke pieces.

13. The system of claim 12, wherein the stroke pieces of the document are in scalable vector graphic (SVG) format.

14. The system of claim 8, wherein the delay is computed using a token bucket algorithm.

15. The system of claim 8, wherein the instructions cause the system to transmit images of the document on a different channel using a lazy loading algorithm.

16. The system of claim 8, wherein the plurality of client devices include one or more of a projector, a monitor, a television, an interactive whiteboard, a webcam, a microphone, a loudspeaker, a CD/DVD player, an electronic paper device, an electronic reader device, a desktop computer, a tablet, or a smartphone.

17. A computer program product comprising a non-transitory computer usable medium including a computer readable program, wherein the computer readable program when executed on a computer causes the computer to:
    receive a document for distribution to the plurality of client devices in a collaboration session;
    break the document into pieces; and
    repeatedly, until all pieces of the document are distributed:
       select a piece of the document for transmission from a first collaboration session queue;
       add the selected piece to a global queue for transmission;
       send the selected piece simultaneously to each of the plurality of client devices;
       compute a delay between sending the selected piece and sending a next piece of the document to each of the plurality of client devices based on a size of the selected piece and a minimum network bandwidth, wherein the minimum network bandwidth is determined based on a bandwidth of a client device, of the plurality of client devices, having a limited bandwidth connection;
       update the global queue by adding data from a second collaboration session queue while waiting for the computed delay to send the next piece to each of the plurality of client devices;
       synchronize the sending of the next piece to the plurality of client devices by waiting for the computed delay to send the next piece to each of the plurality of client devices; and
    destroying the first collaboration session queue in response to all pieces of the document being distributed.

18. The computer program product of claim 17, wherein the computer readable program further causes the computer to create the first collaboration session queue in response to receiving the document.

19. The computer program product of claim 17, wherein the computer readable program further causes the computer to send the selected piece using eXtensible Messaging and Presence Protocol (XMPP).

20. The computer program product of claim 17, wherein to select the piece of the document for transmission, the computer readable program further causes the computer to:
    determine a page most viewed by users of the plurality of client devices; and
    select the page most viewed for transmission.

* * * * *